INVENTOR.
CARL HOROWITZ

Feb. 22, 1966  C. HOROWITZ  3,236,695
ELECTROCHEMICAL DEVICE
Filed July 16, 1962  2 Sheets-Sheet 2

INVENTOR
CARL HOROWITZ

BY

ATTORNEY

United States Patent Office 3,236,695
Patented Feb. 22, 1966

3,236,695
ELECTROCHEMICAL DEVICE
Carl Horowitz, Brooklyn, N.Y., assignor to Yardney International Corp., New York, N.Y., a corporation of New York
Filed July 16, 1962, Ser. No. 210,077
3 Claims. (Cl. 136—102)

The present invention relates to nylon polymers resulting from the reaction of a dibasic acid with a diamine, and to the polymerized filaments and fabrics obtained from such reaction products. This application is a continuation-in-part of application Serial Number 542,596, filed October 25, 1955, and a continuation-in-part of application Serial Number 791,380, filed February 5, 1959, both now abandoned.

Nylon, as originally produced and defined, for instance, in U.S. Patent No. 2,071,250 to Carrothers, is the polymer of the reaction product of dibasic acids with diamines. Examples of such acids include adipic and sebacic acids; outstanding among the diamines useful for the manufacture of nylons is hexamethylene diamine. Stressed filaments of such polymers were among the first synthetic fibers useful in the manufacture of commercial fabrics. The outstanding strength and chemical resistance of these fabrics has won them wide acceptance. Conventional commercial nylon fabrics have, however, an important drawback to which there is much objection. They do not absorb moisture nor are they wetted by aqueous solutions. This lack of wettability prevents absorption and transpiration of exuded body moisture with the consequent result that clothes made from such materials are hot and steaming in the summer and cold and clammy in the winter.

It is an object of this invention to provide a wettable nylon and a treatment for making commercially available nylon wettable.

It is another object of this invention to provide fabrics made from wettable nylons and structures made from such fabrics capable of special uses.

It is a further object of this invention to provide a method of treatment whereby the nylon molecule is modified in such manner as apparently to remove hydrophobic groupings from the surface of the nylon, thereby permitting it to be wetted by aqueous solutions.

It is still another object of this invention to provide wettable nylons suitable for use under conditions and in solutions where the hydrophobic properties of presently known nylons prevent proper utilization of their desirable qualities.

The treatment of this invention consists, fundamentally, in the heating of nylons in dilute solutions and in the presence of ionizable and non-ionizable hydroxyl groups until substantially all nitrogen atoms capable of being converted to ammonia have been removed from the surface of the nylon.

The exact mechanism of the process according to our invention is not clearly understood in the light of present empiric knowledge of the polymerization reaction, but certain observations provide ground for the belief that the reaction is based on the hydrolysis of nitrogen groupings from the surface of the polymer structure. It may be postulated that particularly linear polyamides (nylon fibers), when subjected to the stressing operations which are part of the manufacturing process, accumulate at the surface nitrogen-containing hydrophobic groups. Our present treatment apparently hydrolyses the surface molecules of the nylon to replace these hydrophobic groups by oxy- or hydroxy-groupings whereby the material is rendered hydrophilic.

The foregoing theory concerning the mechanics of the treatment is borne out by the discovery that nylon articles such as threads, woven fabrics, felts (and, to a more limited extent, also sheets and films), when heated for long periods of time in alkaline solution, will at a certain stage commence evolving ammonia. We have further found that when this evolution of ammonia is completed, the articles are no longer hydrophobic but, on the contrary, are wettable to a surprising extent.

Ordinary nylon fabrics, for example, when dipped into water and withdrawn will pick up liquid in an amount of approximately 7–10% by weight. Nylons treated in accordance with this invention will pick up water to the extent of 50–75% of their dry weight.

The preferred treating solutions of this invention contain approximately 2–5% of caustic alkali, i.e. sodium or potassium hydroxide, in water and, for optimum hydrolyzation rates, preferably contain additionally 1–20% of alcohols having boiling points above 80° C.

For optimum conversion of the nitrogen-containing surface groups to ammonia, and the evolution of the freed ammonia from the solution, we have found that a solution/fiber ratio greater than 10:1 is desirable, i.e. for each gram of nylon at least 10 grams of solution is recommended. When the solution is maintained at or near its boiling point in the presence of alcohol, the conversion of the nitrogen groups to ammonia and the initiation of ammonia evolution will take place after 12–15 hours. The initiation time varies with the particular polyamide. The immersion treatment is continued until ammonia vapors are no longer evolved, as evidenced by simple chemical or olefactory tests. In general, this ammonia evolution takes 1–6 hours, depending on the treatment temperature of the caustic solution and the character of the nylons involved.

While the conversion of the nitrogen groups and the evolution of the ammonia can take place in the absence of the non-ionizable hydroxyl groups supplied by the alcohol, we have found that in the absence of such groups this conversion and evolution will be initiated only after a much longer period (up to three times as long as with alcohol) and will proceed at a lower rate. There are also indications that such prolonged treatment times may impair the tensile strength of the nylon.

The invention is particularly applicable to simple polymers of molecular weights greater than 10,000 which are best adapted to withstand the type of treatment herein described.

Among the nylons useful for the process of this invention, in addition to the polyhexamethylene adipamide (the conventional and original nylon), there may be mentioned by way of further example polytetramethylene sebacamide, polypentamethylene adipamide, polypentamethylene sebacamide, polyhexamethylene glutaramide, polyhexamethylene sebacamide, polyoctamethylene adipamide, polydecamethylene carbamide, poly-p-xylene sebacamide, polyphenylene diacetamide, polyphenylene sebacamide and the polyamides derived from the reaction of the dibasic acids with various amino-ethers of which 3,3′-diaminodipropylether is representative.

Among the polymerizable amino acids yielding high-molecular-weight polyamides suitable for treatment in accordance with the invention there may also be included, for instance, 6-aminocaproic acid, 9-aminononanoic acid and the amide-forming derivatives thereof including the commercially available D.1, ε-caprolactam.

The solution in which the process of this invention is carried out should have an alkalinity at least as strong as that of ¼% potassium hydroxide at 80° C. Sodium, potassium, lithium, barium, strontium and calcium hydroxides and the carbonates of the first two, if used in the proper amounts, will serve to hydrolize the nitrogen groups. Ammonium hydroxide or its organic equivalents, the quaternary ammonium bases, cannot serve in this type of treatment since they would limit the hydroylsis or reaction with the nitrogen groups to form ammonia.

The invention will be more particularly described in connection with the accompanying drawing in which.

Figure 1:
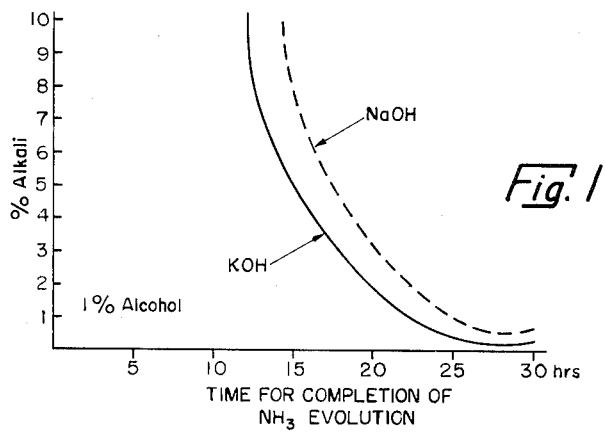
FIG. 1 is a graph representing the time for completion of the evolution of ammonia from the treatment bath as a function of the alkali concentration.

From FIG. 1, it will be noted that an amount of alkali exceeding approximately ¼% affects the time for initiation and completion of the $NH_3$ evolution. We have found that the reaction time becomes measurable only if the pH of the heated solution is 11 or higher. At lower pH there is very little evidence of hydrolysis, as any $NH_3$ that might be released accumulates in the solution and tends to halt the reaction. As might be expected, the curve (dotted line), for NaOH practically parallels the curve (solid line) for KOH. The other strong alkalis behave in similar fashion. Increasing the pH above 14 does not, however, have any apparent further effect on the reaction rate. It appears that once the requisite amount of alkali is present, there is very little reaction dependence on the alkali concentration, especially if the treatment is carried out in a large volume of the treatment bath.

Figure 2:
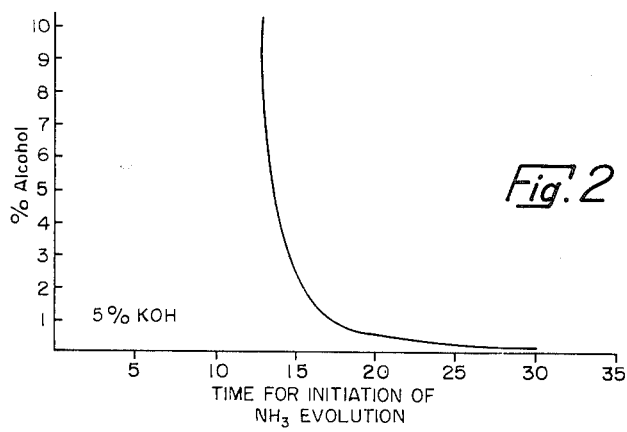
FIG. 2 is a graph representing the time required for the initiation of ammonia evolution as a function of the amount of alcohol present in the treatment bath.

FIG. 2 shows a curve illustrating the catalytic effect of non-ionized hydroxyl groups on the reaction. N-butyl alcohol was the alcohol used for this experiment but essentially the same form of curve was obtained for the other alkyl and aralkyl alcohols. The reaction mixtures was a boiling 5% KOH solution. The lower alcohols, of course, are limited in usefulness to this process by reason of the fact that they distill from the solution at temperatures below those most effective for the treatment of this invention. Under reflux and pressure conditions, it has been possible, however, to utilize such low-boiling alcohols at temperatures in the range where the process of this invention will proceed at satisfactory rates.

It will be noted that the presence of alcohol is not necessary for effecting the change in nylon wettability that characterizes this invention, the alcohol merely serving as a rate-governing catalyst. Without the alcohol, a boiling 5% solution of KOH will improve the wettability of the nylon after 35–50 hours of treatment. In contrast, the presence of 1–5% of alcohol as an adjuvant will give the same wettability improvement after only 14–17 hours of treatment.

In the same fashion that the lower alcohols limit the temperature of the treatment bath, the higher alcohols impose a limitation on their use by their sparse solubility in the alkaline solutions. While their solubility is somewhat greater in alkaline media than in water, the desired effect is best achieved with alcohols having a chain of less than 7 alkyl carbon atoms adjacent the hydroxyl group. Phenols as a group have a marked tendency to reduce the tensile strength of nylon filaments, yet both alkyl and aralkyl alcohols exhibit catalytic effects within the limits of their solubility in the treatment bath.

Figure 3:
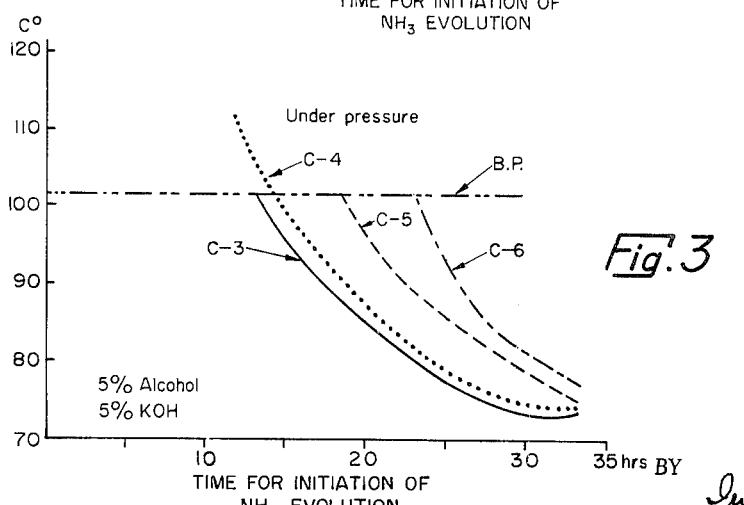
FIG. 3 is a graph plotting the times required for the initiation of the ammonia evolution as a function of the temperature of the treatment bath.

FIG. 3 shows several curves representing the relationship, in the presence of different alcohols, of the time for initiation of the ammonia evolution to the temperature at which the reaction takes place. It will be noted that below 70° C. the reaction time becomes excessively long. For the $C_4$ alcohol the temperature scale was extended above the boiling point of the KOH solution (120° C.) by the use of an autoclave.

Following are a number of specific examples illustrating the process of the invention. The nylon referred to therein is the conventional and original nylon, i.e. the polyhexamethylene adipamide, mentioned above, and disclosed in the U.S. patent to Carrothers, No. 2,071,250.

*Example 1*

Ten kilograms of unspun nylon filaments were treated in 100 liters of a 5% KOH solution containing 2% of butyl alcohol as an additive. The treatment bath was maintained at a slow boil for 12 hours at which time it was noted that ammonia was being evolved from the bath. The boiling continued for another 6 hours until all the ammonia odor was gone. The nylon filaments were filtered from the bath and washed with hot water of 90° C. containing 0.1% sulphuric acid as a neutralizer. After drying the filaments were found to have a water-absorption capacity equaling approximately 65% of the dry weight of the nylon filaments. This compares to a water absorption of 7½% for the untreated material.

*Example 2*

Ten kilograms of nylon jersey fabric were treated in the solution prepared according to Example 1. It was noted that ammonia was evolved after 14 hours and that the ammonia liberation was completed after 21 hours. The fabric after rinsing, drying and neutralizing was found to have a water-absorption capacity of 69% based on the dry weight as compared to a 6% absorption for the untreated fabric.

*Example 3*

A felt of nylon filaments was treated in a bath of 15% aqueous KOH containing 10% of propyl alcohol. The bath was maintained at a temperature of 75° C. for 26 hours at which time it was noted that ammonia evolution had begun. The bath temperature was elevated to boiling and after 2½ hours, the ammonia evolution as determined by Nesseler's reagent had ceased. After washing, neutralizing and drying the felt had an absorption of 40% KOH amounting to 45%. The untreated felt was able to absorb only 8% of the reagent.

*Example 4*

The felt according to Example 3 was treated in a 10% sodium-carbonate solution containing 1% amyl alcohol. It took 19 hours for the initiation of ammonia evolution and 4½ additional hours for completion of this evolution. The treated felt had the same wettability, as determined by water absorption, as the material of Example 3.

*Example 5*

The nylon jersey of Example 2 was treated under a refluxing condensing system in a treatment bath consisting of 5% soda ash (NaOH) and containing 3% of ethyl alcohol. The solution was maintained at its boiling point. Liberated ammonia passed through the condensing system after 17 hours and its evolution was virtually completed, as determined by the usual ammonia test, in 22 hours. The treated nylon jersey was equivalent in wettability to the treated nylon jersey of Example 2.

From the foregoing examples it will be apparent that the nylon filaments and other nylon articles treated in accordance with the invention are capable of sorbing liquids in quantities greater than 40% of the dry weight of the nylon, in contradistinction to articles currently available in commerce in which this sorption amounts to not more than 10%.

Figure 4:
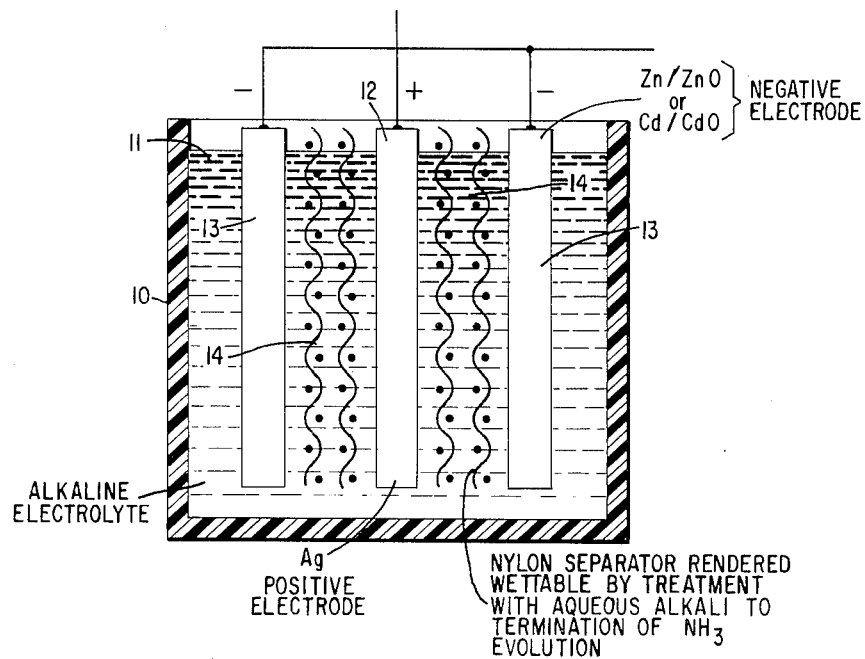
FIG. 4 is a vertical cross-sectional view through a cell embodying the invention.

Nylon fabrics, felts and sheets so treated are highly suitable for use as permeable or semipermeable inter-electrode spacers or separators 14 (FIG. 4) for electrochemical cells, e.g. for the cells of alkaline batteries of, for example, the silver/zinc and silver/cadmium types. This is so because nylon is highly resistant to both alkaline and acidic electrolytes but has heretofore found only limited application as a separator material because of its low wettability in such media. Particularly in the case of alkaline batteries, it is possible to treat the nylon in situ, i.e. to subject it in the alkaline electrolytic medium itself to elevated temperatures for the necessary length of time. The washing and drying steps previously referred to will, of course, be omitted in such cases. The battery can include a casing 10 retaining the alkaline electrolyte 11 and a silver positive electrode 12 flanked by the negative electrodes 13.

Whereas the invention has been described with reference to specific forms thereof, it will be understood that many changes and modifications may be made without departing from the spirit of this invention.

What is claimed is:

1. A current-generating battery cell comprising a pair of juxtaposed electrodes including a silver/silver oxide positive electrode and a negative electrode selected from the group consisting of zinc/zinc oxide and cadimum/cadmium oxide immersed in an alkaline electrolyte, and an electrolyte-permeable separator of nylon treated with an aqueous solution of excess inorganic alkali at an elevated temperature and for a period sufficient to result in evolution of ammonia from said nylon to completion.

2. A current-generating battery cell comprising a pair of juxtaposed electrodes including a silver/silver oxide positive electrode and a negative electrode selected from the group consisting of zinc/zinc oxide and cadmium/cadmium oxide immersed in an alkaline electrolyte, and an electrolyte-permeable separator of nylon treated with about a 2% to 5% aqueous solution of excess inorganic alkali at an elevated temperature in excess of about 80° C. and for a period upwards of about 1 hour and sufficient to result in evolution of ammonia from said nylon to completion.

3. A current-generating battery cell comprising a pair of juxtaposed electrodes including a silver/silver oxide positive electrode and a negative electrode selected from the group consisting of zinc/zinc oxide and cadmium/cadmium oxide immersed in an alkaline electrolyte, and an electrolyte-permeable separator of nylon having an average molecular weight above about 10,000 and treated with about a 2% to 5% aqueous solution of excess inorganic alkali and between substantially 1 and 20% of an alcohol whose boiling point is in excess of about 80° C. at an elevated temperature in excess of about 80° C. and for a period upwards of about 1 hour and sufficient to result in evolution of amonia from said nylon to completion.

References Cited by the Examiner

UNITED STATES PATENTS

| 2,201,741 | 5/1940 | Owens et al. | 8—115.5 |
| 2,511,887 | 6/1950 | Vinal | 136—146 |
| 2,591,755 | 4/1952 | Wilson et al. | 136—146.26 |
| 2,635,127 | 4/1953 | Yardney et al. | 136—146 |
| 2,956,100 | 10/1960 | Mendelsohn et al. | 136—146 |

FOREIGN PATENTS

| 534,618 | 3/1941 | Great Britain. |

WINSTON A. DOUGLAS, *Primary Examiner.*

JOHN H. MACK, *Examiner.*